March 31, 1936.                H. G. SMITH, JR., ET AL                2,035,622
                                  IMPULSE COUPLING
                                 Filed Nov. 15, 1934

INVENTORS
Harry G. Smith, Jr.
LeRoy S. Dunham
A. D. Libby
ATTORNEY

Patented Mar. 31, 1936

2,035,622

UNITED STATES PATENT OFFICE 2,035,622

IMPULSE COUPLING

Harry G. Smith, Jr., Union, and Le Roy S. Dunham, East Orange, N. J., assignors to Edison-Splitdorf Corporation, West Orange, N. J., a corporation of New Jersey Application November 15, 1934, Serial No. 753,148

11 Claims. (Cl. 123—149)

This invention relates to improvements in impulse couplings which are used on ignition generators for furnishing ignition current to internal combustion engines.

The use of such devices for producing a hot spark at the time of starting internal combustion engines is old and the general principles of operation are well understood, so that it does not appear necessary to elaborate on the usefulness and general application of such a device, but rather to point out the specific details wherein our improvement lies.

In general, however, it may be said that our invention is directed to and therefore has as one of its objects the general simplification and improvements in a device of this character, our improvements being directed to the design of an impulse coupling wherein the parts have relatively little wobble therebetween so that the coupling may be driven by a gear or sprocket member attached to the driving element of the coupling, which type of drive is unusual for a device of this kind. At the same time, the coupling may be driven from the shaft in the same horizontal alignment as the shaft of the ignition generator carrying the coupling.

Another object of our invention is to provide an impulse coupling which we believe to be better sealed or protected from dust, dirt, water and other exterior deleterious elements.

Other objects of our invention will be clear to one familiar with impulse couplings from a reading of the specification as follows, taken in connection with the annexed drawing, wherein.

Figure 4:
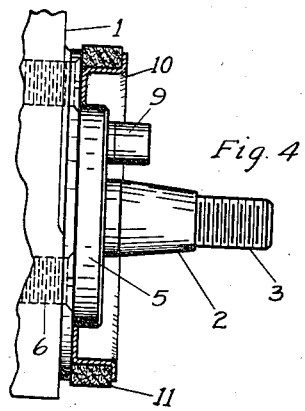
Figure 4 is a part-elevational and part-sectional view through the stop member and closure means adjacent the end of the ignition generator.
Figure 5:
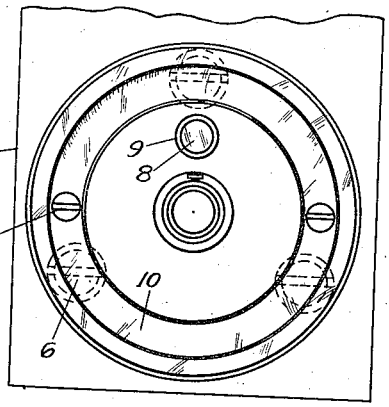
Figure 5 is an end view of Figure 4.

In the various figures, wherein like numbers refer to corresponding parts, 1 is the end plate or part of the framework of an ignition generator such as a magneto. The generator has a shaft terminating in a tapered surface 2 and a threaded end 3. The frame 1 is provided with an annular dowel 4. Concentric with the generator shaft and fitting around the dowel 4 is a stop plate 5, the same being held to the framework with any satisfactory means as by a plurality of screws 6 which preferably have heads to fit countersunk holes in the stop plate 5, so that the heads of the screws are flush with the flange 7 of the stop plate 5. Securely fastened to the stop plate 5 is a stop pin which, as shown, comprises a stud 8 carrying a collar 9 which is adapted to rotate on the stud 8.

Figure 3:
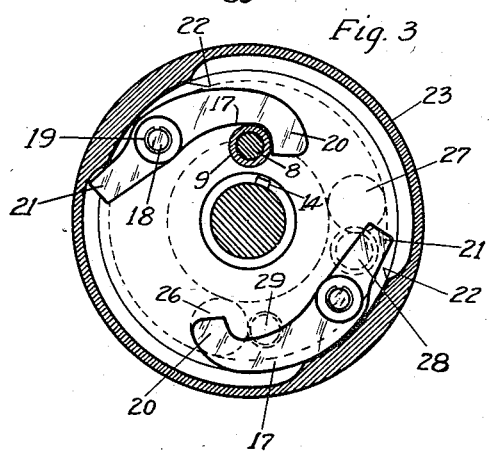
Figure 3 is a section through the coupling on the line 3—3 of Figure 2 with the driven member held in impulsing position and with one of the retaining pawls just engaging a release cam on the driving member.

Concentrically positioned with respect to the generator shaft and located on the flange 7 of the stop plate 5, is a retaining ring 10 formed in a manner so as to support a gasket 11 made of suitable material such as a proper grade of felt, the purpose of which will be later pointed out. The retaining ring 10 may be held in place in any satisfactory manner as by screws 33. Positioned on the tapered portion 2 of the shaft is a driven member having a flange portion 12 and a hub 13 of considerable length; that is to say, much longer than is found in impulse couplings of this character. The driven member is fastened to the tapered portion 2 by means of a key 14 and a nut 15 fitting the threaded end 3 and a lock washer 16. On the inner end of the flange 12 of the driven member there are positioned one or more pawls 17, two being shown in Figure 3, whereby two impulses per revolution of the coupling are provided. Each of the pawls 17 is fastened to the flange 12 through the medium of a stud 18, being held on the stud in any satisfactory manner as by a snap lock ring 19. The inner end of the pawl 17 is provided with a hook portion 20 adapted to engage the stop pin 8 or the collar 9, if that be used. The outer end 21 of the pawl 17 is adapted to engage a cam surface 22 preferably formed directly on the inner surface of the driving member. The cam or cams 22 are of course properly located in conjunction with the pawl 17 so as to engage the ends 21 thereof to release the pawls to give the impulse at the proper time.

Positioned on the relatively long hub 13 of the driven member is a driving member 23 having a portion fitting over or seated on the hub 13, and this portion of the driving member 23 is provided with a recess within which is positioned a gasket 24 which is preferably lubricated when assembled and acts to lubricate the seat as well as to close this end of the coupling from the ingress of deleterious elements.

Figure 2:
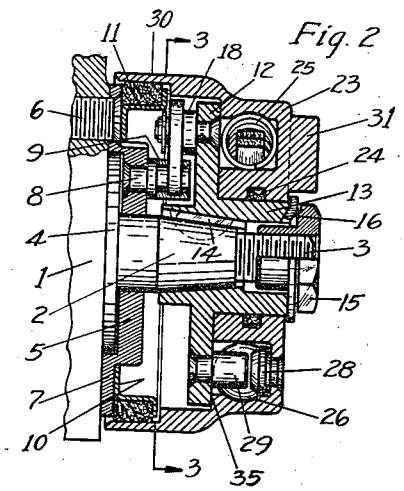
Figure 2 is a section on the line 2—2 of Figure 1.
Figure 1:
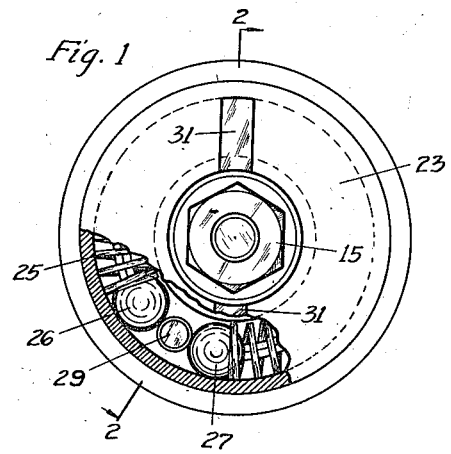
Figure 1 is an end view of our improved coupling with a portion of the driving member broken away to show certain of the interior parts.

Concentrically arranged in the driving member 23 and around the portion of the driving member fitting over the hub 13, is a recess within which is positioned a spring 25 having its opposite ends engaging balls 26 and 27 that rest against a stop 28 located within the recess. The flange 12 of the driven member has a driving pin or stud 29 (see Figure 2) which is in substantial alignment with the stop 28 and extends between the balls 26 and 27 to a point about as indicated in Figure 2.

The driving member 23 is substantially cup-shaped and has its rim 30 extending over and into contact with the gasket 11, thus sealing the inner end of the coupling from outside deleterious matter. The driving member 23 is held in place by the edge of the washer 16 and is provided with any suitable means for driving it, the means shown being a pair of rectangular-shaped studs 31 which are shaped and positioned to cooperate with another member of an Oldham type of coupling which is many times used when the driving shaft is in alignment with the generator shaft.

However, by the construction herein described, we have provided a mounting between the driving and driven member such as to prevent or reduce to a very low minimum the wobble between these parts, so that the driving member of the coupling may be coupled to a gear or sprocket wheel driven from some shaft not in alignment with the generator shaft. The gear or sprocket wheel may be fastened to the driving member in any satisfactory manner as by suitable screws, in which case the studs 31 would be absent; or the gear or sprocket wheel may be pressed onto a seat over the outer diameter of the driving member concentric with the hub 13 of the driven member. This is especially advantageous as many occasions arise where it is difficult to get a tandem drive for the ignition generator. If the usual impulse coupling be driven by a gear or sprocket and chain, the driven member will wobble so as to make the installation very noisy and soon give trouble.

"Wobble" is further prevented by reason of the flange 12 having a bearing on the annular seat 35 of the driving member 23 and since this bearing seat is some distance from the shaft center, it has a decided effect in preventing "wobble". The combination of this seat and the long hub seat makes a much improved structure.

Figure 6:
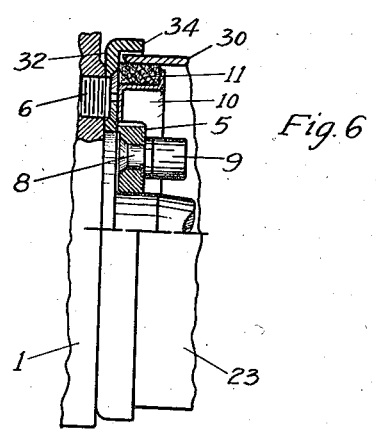
Figure 6 is a view somewhat similar to Figure 4 but showing a slightly modified form of closure means.

In Figure 6, an additional or auxiliary closing means may be used in the form of a part 32 which preferably is an extension of the stop plate 5. The portion 32 has a flange 34 adapted to extend over and outside the rim 30 of the driving member, thereby making it still harder for deleterious material to get into the coupling.

From the construction described, it will be seen that there are no exposed irregular surfaces or parts of the coupling, such as exterior stop pawls and cam surfaces for the release thereof or projecting stop pawls, such as found on many of the prior art devices, but instead, the driving member is so constructed as to act as a complete smooth-finished housing in itself for all of the parts used in the coupling, and as a result a very small, neat and compact structure is obtained.

Where the coupling is used on tractors in very dusty sections of the country, the entire drive mechanism, including the coupling itself, may be enclosed in a boot or rubber sleeve similar to a section of an automobile inner tube, thus preventing excessive wear on these driving parts.

No description of the detail operation of the device is necessary as this is old and well understood.

What we claim is:

1. In a structure of the character described including driving and driven members with an impulsing spring interposed between said members so as to impulse the driven member according to usual practice, said device being characterized as follows; a stop plate is fastened to the generator frame to which the structure is applied and concentric with the shaft of said generator, said plate carrying a stop member, at least one pawl carried by the driven member for engaging said stop member to tension said spring, said pawl having an arm extending into the path of movement of release cams on the interior of the driving member, a retaining ring concentrically arranged around said stop plate and carrying a gasket on its outer periphery, said driving member having an annular rim extending over and in contact with said gasket.

2. An impulse coupling as described in claim 1, further characterized in that the retaining ring is fastened to the stop plate and the stop member is in the form of a pin having a cylindrical roller carried on a stud securely anchored to the stop plate while said pawl is provided with a hook at its inner end for engaging said roller.

3. An impulse coupling as set forth in claim 1, further characterized in that the driven member has a relatively long hub and the driving member also has a relatively long portion seated on said hub.

4. An impulse coupling as set forth in claim 1, further characterized in that the driven member has a relatively long hub and the driving member also has a relatively long portion seated on said hub, and a gasket located in sealing position between said hub and cooperative portion of the driving member.

5. An impulse coupling as set forth in claim 1, further characterized in that an auxiliary closure means is provided adjacent said gasket ring and has a flange extending a distance over the rim of the driving member.

6. An impulse coupling as set forth in claim 1, further characterized in that the driven member has a relatively long hub and the driving member also has a relatively long portion seated on said hub, and further characterized in that the driving member has an annular inner seat of considerable diameter, while the driven member has a flange extending into overlapping relationship with said annular seat on the driving member.

7. An impulse coupling for an ignition generator having a shaft including; a stop plate fastened to the generator frame concentric with its shaft, a stop member carried by said plate, a retaining ring carrying a gasket at its periphery and concentric to said shaft, a driven member carried on said shaft and having at least one pawl having one end adapted to engage said stop member, said driven member having a relatively long hub, a cup-shaped driving member having a portion seated over said hub and an annular recess surrounding said seat portion, a stop in said recess, balls positioned against said stop, a coiled spring lying in the recess and having its ends positioned against said balls, a driving pin carried by the driven member and extending between said balls in substantial alignment with said stop in the recess, said rim of the cup extending over and in contact with said previously mentioned gasket, at least one cam on the interior surface of the cup-shaped driving member, said pawl having an end adapted to engage said cam after a predetermined movement of the driving member following a period of restriction of the driven member by the other end of the pawl engaging said stop member, and a gasket located in operative position at the seat on the hub of the driven member.

8. An impulse coupling as set forth in claim 7, further characterized in that an auxiliary means is located adjacent said retaining ring and having a flange extending a distance over the rim of the driving member.

9. An impulse coupling for an ignition generator including a stop plate and member carried on the frame of the generator and a driven member having an extended hub adapted to be fastened to the generator shaft, a driving member having a portion seated on said extended hub and having a rim forming a complete casing for all the operating parts inter-connected between the driving and driven members to produce the impulse, a ring mounted concentrically with the shaft and carrying a gasket at its periphery in contact with the inner end of the rim of the driving member to seal this end of the coupling, and a gasket at the seat on said hub to seal the coupling at this point, and means on the driving member through which it may be driven.

10. An impulse coupling structure as set forth in claim 9, further characterized in that the stop plate is dowelled around a portion of the generator frame.

11. An impulse coupling structure as set forth in claim 9, further characterized in that the driving member has an internal annular seat on its rim portion, while the driven member has a flange overlapping and engaging said annular seat as and for the purpose described.

HARRY G. SMITH, Jr.
LE ROY S. DUNHAM.